United States Patent
Hirako (10) Patent No.: US 7,684,535 B2
(45) Date of Patent: Mar. 23, 2010

(54) REACTOR CONTAINMENT VESSEL

(75) Inventor: Shizuka Hirako, Hitachi (JP)

(73) Assignee: Hitachi-GE Nuclear Energy, Ltd., Tokyo (JP)

( * ) Notice: Subject to any disclaimer, the term of this patent is extended or adjusted under 35 U.S.C. 154(b) by 0 days.

(21) Appl. No.: 11/679,978

(22) Filed: Feb. 28, 2007

(65) Prior Publication Data

US 2008/0037696 A1    Feb. 14, 2008

(30) Foreign Application Priority Data

Feb. 28, 2006   (JP) ............................ 2006-051473

(51) Int. Cl.
  *G21C 9/00* (2006.01)
(52) U.S. Cl. .................. 376/293; 376/287; 376/283
(58) Field of Classification Search ......... 376/293–296, 376/287, 277, 283
  See application file for complete search history.

(56) References Cited

U.S. PATENT DOCUMENTS

| | | | | |
|---|---|---|---|---|
| 3,454,466 A | * | 7/1969 | Lemon et al. ............... | 376/283 |
| 3,494,828 A | * | 2/1970 | Chave ......................... | 376/283 |
| 3,713,968 A | * | 1/1973 | Kennedy et al. ............ | 376/293 |
| 3,752,738 A | * | 8/1973 | Naymark .................... | 376/293 |
| 4,210,614 A | * | 7/1980 | Kleimola .................... | 261/124 |
| 5,098,646 A | * | 3/1992 | Oosterkamp ................ | 376/283 |
| 5,276,720 A | * | 1/1994 | Oosterkamp et al. ....... | 376/283 |
| 5,301,215 A | * | 4/1994 | Gou et al. ................... | 376/283 |
| 5,499,278 A | * | 3/1996 | Gluntz ........................ | 376/299 |
| 6,745,533 B2 | * | 6/2004 | Yamashita et al. .......... | 52/425 |

FOREIGN PATENT DOCUMENTS

| JP | 09-236684 | 9/1997 |
|---|---|---|
| JP | 10-282285 | 10/1998 |

OTHER PUBLICATIONS

"Status of Advanced light water reactor designs 2004" p. 223-225, IAEA-TECDOC-1391, May 2004.

(Continued)

*Primary Examiner*—Rick Palabrica
(74) *Attorney, Agent, or Firm*—Antonelli, Terry, Stout & Kraus, LLP.

(57) ABSTRACT

A reactor containment vessel of the present invention has a primary reactor containment vessel disposing a dry well for storing a reactor pressure vessel, a wet well for storing a pressure suppression pool, and an equipment room disposing below said pressure suppression pool inside thereof. Further, the primary reactor containment vessel includes an outer cylindrical wall reaching to a base mat from a top slab of the primary reactor containment vessel and facing the drywell, the pressure suppression pool and the equipment room respectively, an inner cylindrical wall facing the pressure suppression pool and the equipment room respectively, and a pressure suppression pool floor partitioning among the pressure suppression pool and the equipment room, and an outside portion of the outer cylindrical wall, an inside portion of the inner cylindrical wall, an outside portion of the ceiling and a lower portion of the pressure suppression pool floor are formed of a steel plate reinforced concrete respectively.

The reactor containment vessel can contribute to shorten construction period and thereby improve economic efficiency of nuclear power generation facilities.

11 Claims, 7 Drawing Sheets

OTHER PUBLICATIONS

"Construction of Kashiwazaki Kariwa Nuclear Power Station", Tokyo Electric Power Company, Inc., Dec. 1993 (Japanese language).

English language Translation of pertinent portions of above cited "Construction of Kashiwazaki Kariwa Nuclear Power-Station", Tokyo Electric Power Company, Inc., Dec. 1993.

"Advanced Boiling Water Reactor", Hitachi Catalog, Hitachi, Ltd., Aug. 1995 (Japanese catalog).

English language catalog corresponding to Japanese language catalog of above cited "Advanced Boiling Water Reactor", Hitachi Catalog, Hitachi. Ltd.

* cited by examiner

CONSTRUCTION OF BASE MAT 9

↓ ↓

CONSTRUCTION OF CYLINDRICAL WALL 16 POSITIONING BELLOW PRESSURE SUPPRESSION POOL    CONSTRUCTION OF PRESSURE SUPPRESSION POOL FLOOR 13

↓

CONSTRUCTION OF CYLINDRICAL WALL 16 FACING PRESSURE SUPPRESSION POOL

↓

CONSTRUCTION OF DIAPHRAGM FLOOR 14

↓

CONSTRUCTION OF CYLINDRICAL WALL 16 FACING DRY WELL

↓

CONSTRUCTION OF TOP SLAB 15
(CONTAINMENT VESSEL CEILING PORTION)

↓

CONSTRUCTION OF CONTAINMENT VESSEL UPPER POOL 18

↓

CONSTRUCTION OF REACTOR BUILDING FLOOR 19

PRIOR ART

CONSTRUCTION OF BASE MAT 9

CONSTRUCTION OF CYLINDRICAL WALL 16
POSITIONING BELLOW PRESSURE SUPPRESSION POOL

CONSTRUCTION OF PRESSURE SUPPRESSION POOL FLOOR 13

CONSTRUCTION OF CYLINDRICAL WALL 16 FACING
PRESSURE SUPPRESSION POOL

CONSTRUCTION OF DIAPHRAGM FLOOR 14

CONSTRUCTION OF CYLINDRICAL WALL 16 FACING DRY WELL

CONSTRUCTION OF TOP SLAB 15
(CONTAINMENT VESSEL CEILING PORTION)

CONSTRUCTION OF CONTAINMENT VESSEL UPPER POOL 18

CONSTRUCTION OF REACTOR BUILDING FLOOR 19

REACTOR CONTAINMENT VESSEL

CLAIM OF PRIORITY

The present application claims priority from Japanese application serial no. 2006-051473, filed on Feb. 28, 2006, the content of which is hereby incorporated by reference into this application.

BACKGROUND OF THE INVENTION

The present invention relates to a reactor containment vessel, and more particularly to a primary reactor containment vessel surrounding a reactor pressure vessel, a drywell, a wet well for storing a pressure suppression pool and a vent pipe which connects the drywell and the pressure suppression pool, and a secondary reactor containment vessel which stores the primary reactor containment vessel in a boiling water reactor.

Known types of reactor containment vessel of the boiling water reactor (BWR hereinafter) include reactor containment vessels being used an advanced BWR (ABWR) hereinafter and a latest boiling water reactor which is an economic simplified boiling water reactor (ESBWR). The ESBWR has basically the same configuration as the ABWR, but it is a natural circulation boiling water reactor which includes an equipment room under the pressure suppression pool.

A reactor containment vessel of the ESBWR disposes the pressure suppression pool reactor above a core located over the base mat based on the requirement that cooling water being in the pressure suppression pool is injected into the core using gravity. A pressure suppression pool slab separated from the base mat is installed under the pressure suppression pool. The space formed between the pressure suppression pool slab and the base mat is used as a equipment room. The reactor containment vessel of the ESBWR is described in IAEA-TECDOC-1391, Status of Advanced Light Water Reactor Designs 2004, IAEA, May 2004, Pg. 223-225.

SUMMARY OF THE INVENTION

In construction of nuclear power generation facility, because interest is generated during construction, shortening the construction period is extremely effective in reducing the construction costs.

In constructing a nuclear power generation facility, because the reactor containment vessel forms a critical path in construction process of a reactor building, it becomes possible to shorten a construction period of the reactor building by shortening the construction process of the reactor containment vessel. Based on this background, various studies for shortening the construction process have been performed. However, in the ESBWR, because the equipment room is disposed under the pressure suppression pool, steps of the construction process are more complex than in the case of the ABWR and a number of the steps also are increased.

The construction sequence for the ABWR and the ESBWR are shown below.

<ABWR Construction Sequence>
Construction of a base mat
↓
Construction of a cylindrical wall facing the pressure suppression pool
↓
Construction of a diaphragm floor
↓
Construction of the cylindrical wall facing the drywell
↓
Construction of a top slab (containment vessel ceiling portion)
↓
Construction of a containment vessel upper fuel storage pool
↓
Construction of an operation floor of the reactor building
<ESBWR Construction Sequence>
Construction of base mat
↓
Construction of a cylindrical wall positioning below the pressure suppression pool
↓
Construction of the pressure suppression pool floor
↓
Construction of the cylindrical wall facing the pressure suppression pool
↓
Construction of the diaphragm floor
↓
Construction of the cylindrical wall facing the drywell
↓
Construction of the top slab (containment vessel ceiling portion)
↓
Construction of the containment vessel upper pool
↓
Construction of an operation floor of the reactor building As seen from the above construction sequences, when the ESBWR sequence and the ABWR sequence are compared, two new steps are increased in the ESBWR sequence. The tow new steps are the construction of the cylindrical wall positioning below the pressure suppression pool and the construction of the pressure suppression pool floor. Thus, the construction period for the reactor building is increased a construction period for one floor. The construction period for one floor of the reactor building is generally about 3 months. This causes the construction period for the ESBWR to be 3 months longer than that for the ABWR.

Because in the ESBWR, the pressure suppression pool is placed over the equipment room, transfer of the equipment from the upper level after the construction of the pressure suppression pool is impossible. As a result, A opening is formed in the cylindrical wall facing the equipment room in a transverse direction and the equipment is carried into the equipment room through the opening. However, the equipment installation is carried out in the equipment room with the upper portion closed and this leads to decreased construction efficiency.

The object of the present invention is to provide a reactor containment vessel that can shorten the construction period for the reactor containment vessel used in the ESBWR and increase installation efficiency of the equipment.

The present invention for attaining the object is characterized in that the primary reactor containment vessel includes an outer cylindrical wall reaching to a base mat from a top slab of the primary reactor containment vessel and facing the drywell, the pressure suppression pool and the equipment room respectively, an inner cylindrical wall facing the pressure suppression pool and the equipment room respectively, and a pressure suppression pool floor partitioning among the pressure suppression pool and the equipment room, and an outside portion of the outer cylindrical wall, an inside portion of the inner cylindrical wall, an outside portion of the ceiling and a lower portion of the pressure suppression pool floor are formed of a steel plate reinforced concrete respectively.

To be specific, the steel plate reinforced concrete has a thickness of about 20 mm and a stud for fixing the steel plate to the concrete in surface thereof.

The equipment room partitioned into the pressure suppression pool with a floor is partitioned with steel plate concrete walls installed to have radial configuration. This partitioned equipment room is partitioned at the floor with a steel plate concrete structure in the vertical direction. A safety-related equipment and related pipes and cables as well as heating and ventilation air conditioner ducts are installed in the divided equipment room based on the system requirements.

It is to be noted that the divisions in the primary reactor containment vessel or in other words, the divisions adjoining the drywell for storing a reactor pressure vessel and the wet well for storing the pressure suppression pool is designed as a high temperature and high pressure environment. In order to prevent excessive deformation due to heat, as is the case with the division of primary reactor containment vessel, the structure, that is, the steel plate reinforced concrete being used the divisions is the same as a reinforced concrete containment vessel which has a 6.4 mm thick steel plate liner and reinforcement installed at the cylindrical wall.

According to the present invention, a construction process of a reactor containment vessel can be shortened.

BRIEF DESCRIPTION OF THE DRAWINGS

FIG. 1b is a longitudinal sectional view showing another longitudinal section of the reactor containment vessel of FIG. 1a.

FIG. 1c is a longitudinal sectional view showing a detail structure of a steel plate reinforced concrete of FIG. 1a.

FIG. 4b is a cross sectional view showing the reactor containment vessel of FIG. 4a.

FIG. 4c is a longitudinal sectional view showing a detail structure of a steel plate reinforced concrete of FIG. 4a.

DESCRIPTION OF THE PREFERRED EMBODIMENT

The preferred embodiments for realizing the present invention are the following.

(1) An outside portion of a cylindrical wall of the reactor containment vessel is made of steel plate reinforced concrete to the base mat. The side walls and ceiling of the pressure suppression pool are made of steel plate reinforced concrete.

(2) A steel plate reinforced concrete wall is installed below the floor of the pressure suppression pool.

(3) A steel plate reinforced concrete floor is installed at the lower portion of the pressure suppression pool.

Embodiment 1

An embodiment of a reactor containment vessel of the present invention will be described using FIGS. 1a, 1b and 1c.

Figure 1A:
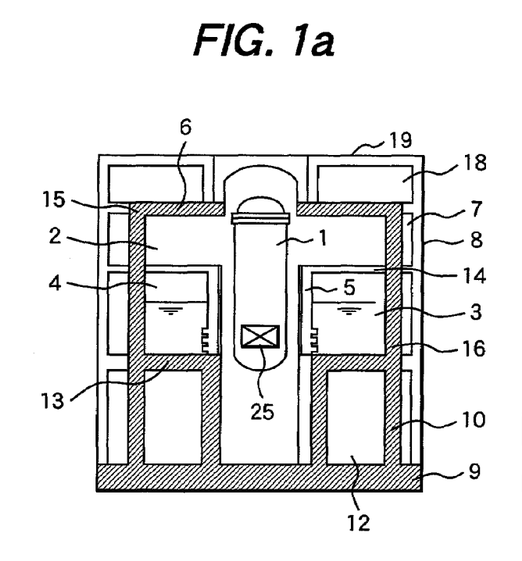
FIG. 1a is a longitudinal sectional view showing a reactor containment vessel according to an embodiment of the present invention.

FIG. 1a is a longitudinal cross sectional form of the reactor containment vessel according to an example of this embodiment of the present invention. FIG. 1b shows regions where steel plates are installed in the reactor containment vessel. The bold lines shown in FIG. 1b show the regions where the steel plates are installed. FIG. 1c shows a longitudinal cross sectional form of the cylindrical wall having the steel plate reinforced concrete, wherein the right-hand portion of the figure shows the steel plate reinforced concrete of the outer cylindrical wall being formed of steel plate 22 fixed to concrete 10 by fixing studs 23 at both inner and outer side surfaces, as represented by the portion of the outer cylindrical wall facing an equipment room 12 as shown in FIG. 1b, and the left-hand portion of the figure shows the steel plate 22 and studs 23 fixed to the concrete 10 only at one side surface, as represented by the outer side surface of the outer cylindrical wall portion which faces a dry well 2 and a wet well 4 as shown in FIG 1b. As shown in FIGS. 1a and 1b, a cylindrical wall 16 of a primary reactor containment vessel 6 reaches to a base mat 9 from a curved portion of a ceiling of the primary reactor containment vessel 6 and is outside wall of a dry well 2 and a pressure suppression pool 3. An equipment room 12 is disposed under the pressure suppression pool 3 and partitioned into the pressure suppression pool 3 with a floor. The equipment room 12 is partitioned with inner side walls installed to have radial configuration.

An outside portion to the base mat 9 of the cylindrical wall 16, an outside portion of the ceiling of the primary reactor containment vessel 6 and both the inner side walls and an inside portion of ceiling of the partitioned equipment room 12 are formed of the steel plate reinforced concrete 10 having the steel plate 22 respectively. A steel plate 22 is not installed in the region which adjoins the dry well 2 and the pressure suppression pool 3 which reach the high pressure state conditions of 171° C. and 104° C. respectively. This is for preventing thermal stretching of the steel plate 22 due to temperature increase.

Figure 1B:
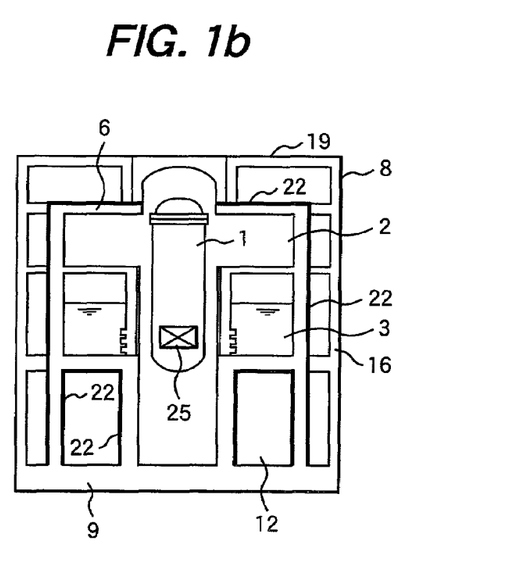
Figure 1C:
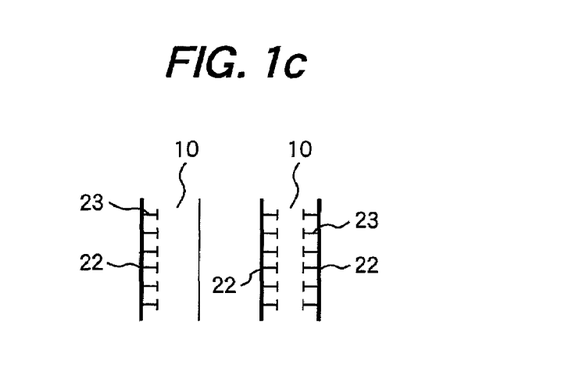

In FIGS. 1a and 1b, the dry well 2 in which a reactor pressure vessel 1 is disposed and the wet well 4 in which the pressure suppression pool 3 is disposed are formed in the primary reactor containment vessel 6. The dry well 2 is partitioned into the wet well 4 with a diaphragm floor 14. Vent pipes 5 which are provided with inside wall of the pressure suppression pool 3 connects the dry well 2 to the pressure suppression pool 3. In the case where design basis accident has been occurred, which is typically main steam pipe breakage, the high temperature and high pressure steam jetted into the dry well 2 is introduced to the pressure suppression pool 3 via the vent pipe 5, and condensed by water in the pressure suppression pool 3. As a result, the pressure and temperature in the dry well 2 is decrease within a set temperature and pressure range and the pressure and temperature is maintained within the set temperature and pressure range. Combined with the operation of the safety system, the reactor containment vessel is a design in which radioactive substances can be safely sealed. Because of the requirement of that the water in the pressure suppression pool 3 is injected into the core 25 of the reactor pressure vessel using gravity, the pressure suppression pool 3 is installed above a core 25 disposed in the reactor pressure vessel 1. The pressure suppression pool 3 in which water is filled is installed on a pressure suppression pool floor 13 disposed over the base mat 9. The space between base mat 9 and the pressure suppression pool floor 13 is used as the equipment room 12. A secondary reactor containment vessel 7 is surrounding the primary reactor containment vessel 6, and even when a small amount of leakage from the primary reactor containment vessel 6 occurs, the secondary reactor containment vessel 7 functions as a supplementary container for the leaked substance from the primary reactor containment vessel 6.

As shown above, in the reactor containment vessel of this embodiment, the outside portion of the cylindrical wall 16 from a top slab 15 of the primary reactor containment vessel 6 to the base mat 9, the upper portion of a top slab 15 and the inner side walls of the equipment room 12 are formed of the steel plate reinforced concrete 10 including a steel plate 22 which has a thickness of about 20 mm and is disposed on surface of the concrete, and a stud 23 for fixing the steel plate 22 to the concrete.

Meanwhile, because the divisions in the primary reactor containment vessel, that is, the divisions which arrange the dry well 2 for storing the reactor pressure vessel 1, the wet well 4 for disposing a pressure suppression pool 3 and the Vent pipes 5 for connecting the wet well 2 and the pressure suppression pool 3 are designed as a high temperature and high pressure environment, in order to prevent excessive deformation due to heat, as is the case with the partition of the conventional primary reactor containment vessel, the structure of the primary reactor containment vessel 6 in this embodiment is the same as the ABWR concrete containment vessel which has 6.4 mm thick steel plate liner at the cylindrical wall 16 and the reinforcement installed inside the cylindrical wall 16. It is to be noted that because a portion between the pressure suppression pool floor 13 and the base mat 9 of the cylindrical wall 16 faces the equipment room, inside and outside portions of the cylindrical wall 16 can be formed of the steel plate reinforced concrete 10 including the steel plate and the studs.

Figure 2:
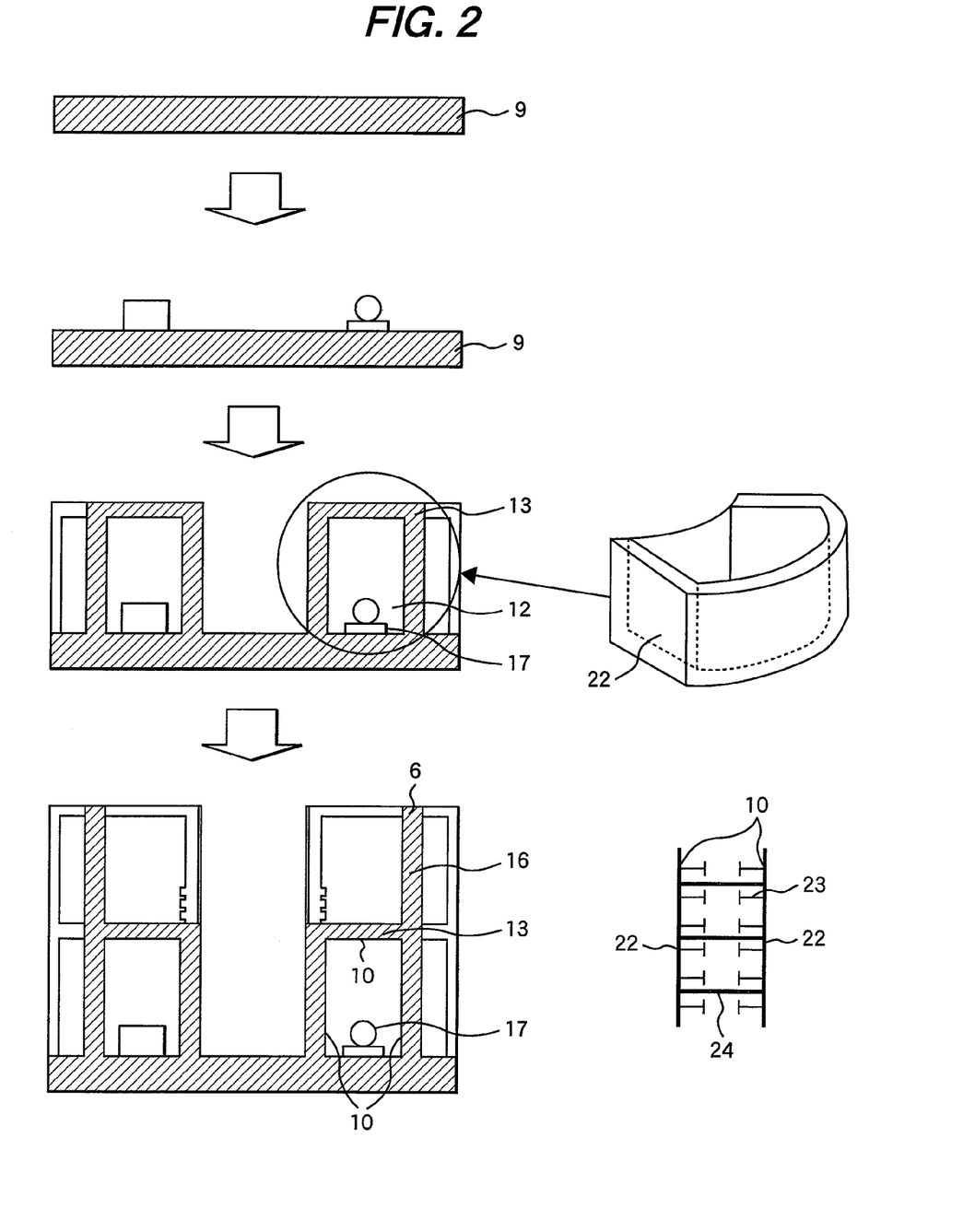
FIG. 2 is an explanatory drawing showing the construction steps for the reactor containment vessel of FIG. 1.
Figure 3:
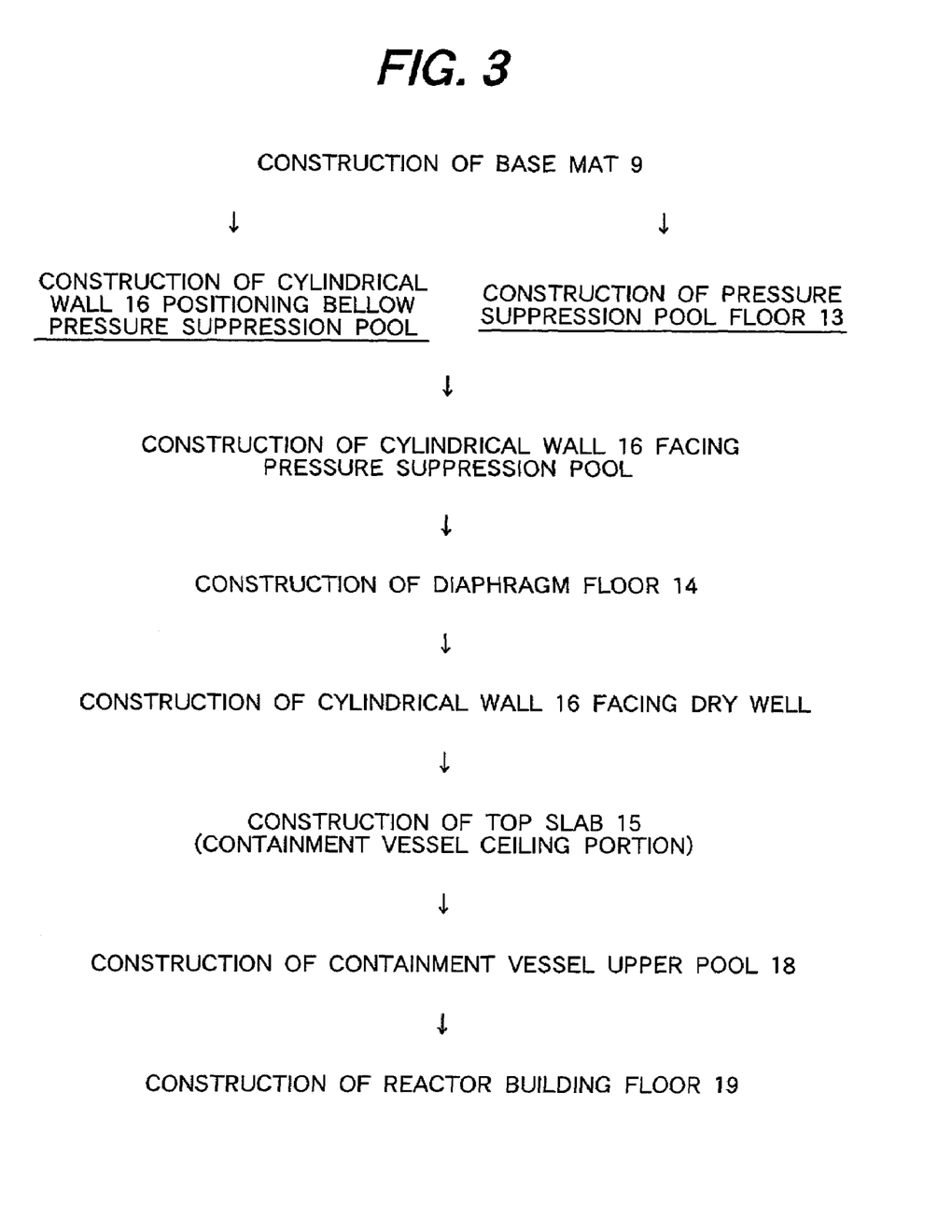
FIG. 3 is an explanatory drawing showing a construction sequence for the reactor containment vessel of FIG. 1.
Figure 6:
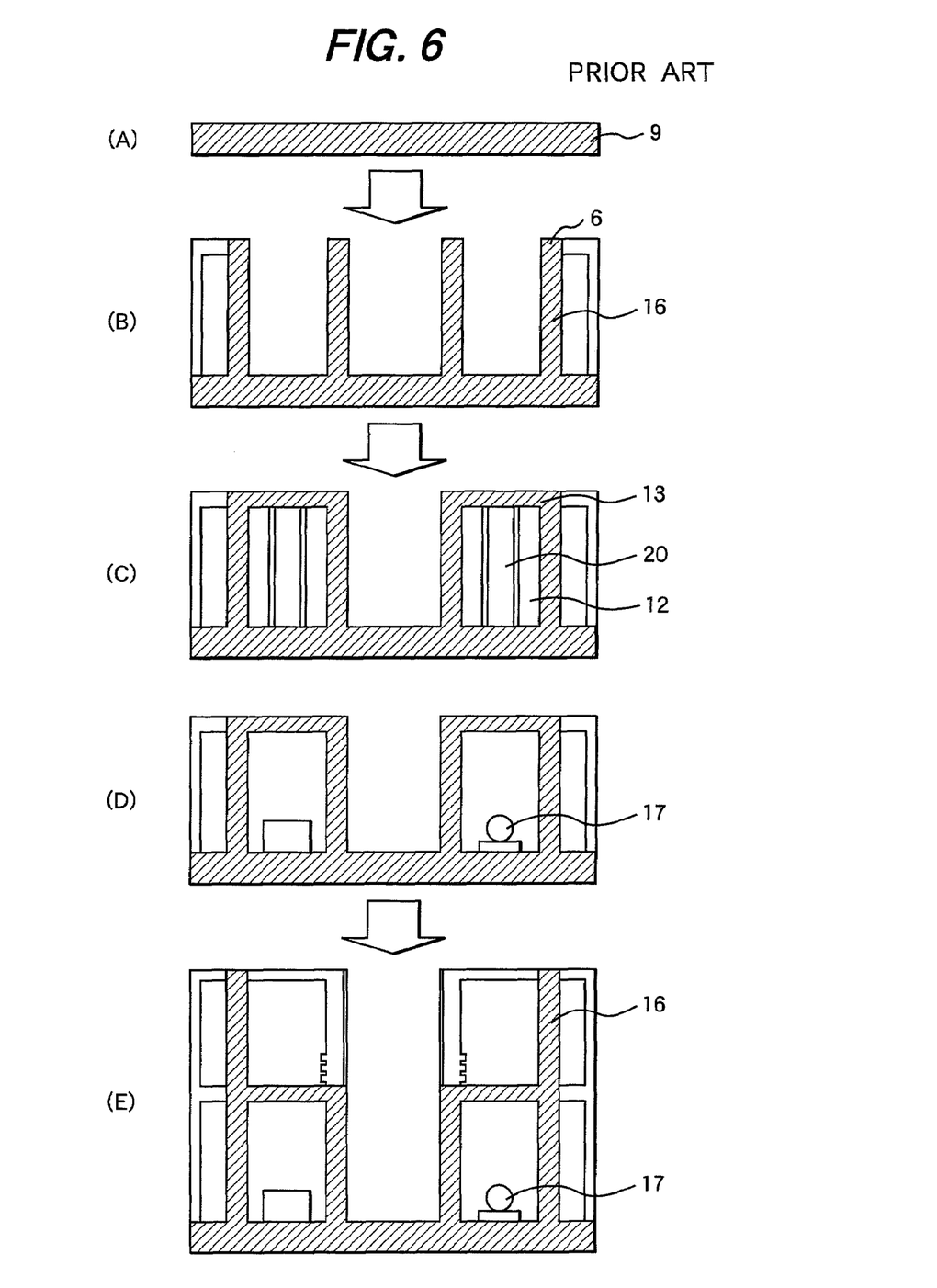
FIG. 6 is an explanatory drawing showing the construction steps for the conventional reactor containment vessel.
Figure 7:
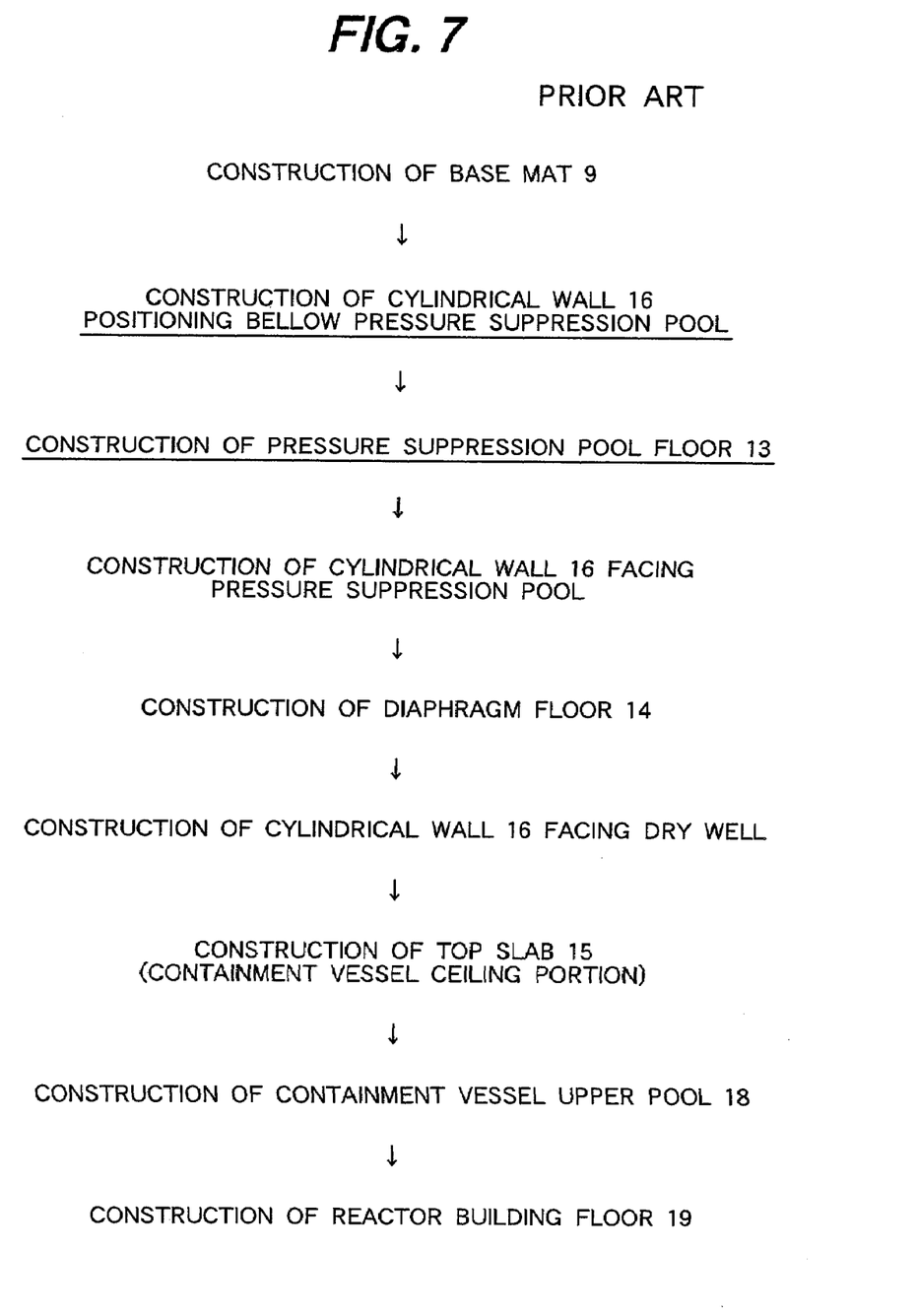
FIG. 7 is an explanatory drawing showing a construction sequence for the conventional reactor containment vessel.

The construction steps in this embodiment are shown in FIG. 2 and the construction sequence is shown in FIG. 3. In addition, the conventional construction steps for the ESBWR primary reactor containment vessel which this embodiment does not use is shown in FIG. 6 and the conventional construction sequence is shown in FIG. 7.

As shown in FIG. 2, in a construction process of the reactor containment vessel of this embodiment, first the base mat 9 is constructed. After the construction of the base mat 9, the equipments are installed on the base mat 9. Subsequently, construction of an inside cylindrical wall and an outside cylindrical wall of the primary reactor containment vessel 6, and the pressure suppression pool floor 13 is done. The cylindrical wall 16 includes the inside cylindrical wall and the outside cylindrical wall disposed concentrically. The equipment room is arranged between the inside cylindrical wall and the outside cylindrical wall. The outside portion and the inside portion of the outside cylindrical wall 16 to the base mat 9 are made of the steel plate reinforced concrete 10. The inside and outside cylindrical walls and the inner side walls which surround the equipment room 12 and a floor of the equipment room 12 are made of the steel plate reinforced concrete 10. As shown in FIG. 2, the walls and floor of equipment room can carry as a metal plate box having an opening at the lower side. The steel plates join with each other via a connecting steel bars 24 called tie bars. Thus, this steel plate box can be maintained configuration thereof at the time of a carry and the construction. When the concrete is injected, the connecting steel bars 24 can be used for connection between the form panels. Furthermore, the steel plate 22 of a ceiling of the equipment room 12 is the bottom for the pressure suppression pool floor 13. Its steel plate 22 functions as a ceiling form panel for building the pressure suppression pool floor 13. Thus construction of the pressure suppression pool floor 13 is done by installing reinforcement and liner plates on the steel plate as the ceiling form panel in the same manner as the ABWR and making concrete to complete construction.

By employing the steel plate reinforced concrete 10, because the steel plates function as the building form panel and reinforcement, after the steel plates are set up, construction of the wall and floors is completed by only injecting concrete.

As shown above, in this embodiment, because the outside portion of the cylindrical wall 16 of the primary reactor containment vessel 6 down to the base mat 9 and the bottom portion of the pressure suppression pool floor 13 are made of the steel plate reinforced concrete 10, the form panel of the cylindrical wall 16 and the pressure suppression pool floor 13 respectively can be built at once, and also the concrete pouring for the cylindrical wall 16 and the pressure suppression pool floor 13 can proceed simultaneously.

After construction of the cylindrical wall 16 below the pressure suppression pool floor 13 and the pressure suppression pool floor 13 is complete, the cylindrical wall 16, that is, the inside portion of the outside cylindrical wall of the reactor containment vessel is built to reach the diaphragm floor 13. Then construction of diaphragm floor 13, cylindrical wall 16 upper the diaphragm floor 13 and top slab are performed in that order.

In this manner, in the reactor containment vessel of this embodiment, construction becomes possible without performing reinforcement bar arrangement and removal at position below the pressure suppression pool 3 because the region from the pressure suppression pool 3 that reaches the base mat can be constructed using a steel plate box which also uses a form panel for concrete formation. By using the cylindrical wall above the pressure suppression pool floor 13 as well as the steel plate below the pressure suppression pool floor 13 in place of the form panel or by using the cylindrical wall above the pressure suppression pool floor 13 as well as the outside steel plate and the inside liner plate, it becomes possible to shorten the construction period.

Meanwhile, in the conventional primary reactor containment vessel of the ESBWR which is shown in FIG. 6 and not used in this embodiment, after the construction of base mat, construction of the cylindrical wall 16 of the primary reactor containment vessel 6 to reach directly below the pressure suppression pool floor 13 is complete. Afterward, construction of the pressure suppression pool floor 13 begins. When the cylindrical wall 16 is being constructed, the form panel is set up and the reinforcement construction is performed. Then concrete is injected and at the stage where appropriate concrete strength is achieved, the form panel is removed.

When the pressure suppression pool floor 13 is constructed, because the support column 20 for holding the form panel of the pressure suppression pool floor 13 must be installed in the equipment room 12, the work of installing the safety-related equipment 17 in the equipment room 12 is not completed until completion of construction of the pressure suppression pool floor 13. Thus other related construction such as pipe laying cannot be completed too. The construction sequence above the pressure suppression pool floor 13 proceeds in the order of form panel construction, reinforcement construction, concrete pouring and form panel removal as is the case for the steps up to the point directly below pressure suppression pool floor 13.

In this manner, when the construction sequence shown in FIG. 3 and that shown in FIG. 7 are compared, in the construction sequence of this embodiment, the region reaching the base mat 9 of the cylindrical wall 16 of the primary reactor containment vessel 6 and the pressure suppression pool floor 13 can be built simultaneously. Because the cylindrical wall 16 and the top slab 15 above the pressure suppression pool floor 13 are also formed of the steel plate reinforced concrete 10, it becomes possible for the construction period to be shortened when compared to the reactor containment vessel that does not apply this embodiment. Standard construction period is evaluated to be three months for one floor of reactor building. According to this evaluation, the construction period for reactor containment vessel of this embodiment can be shortened by about three months less than the conventional primary reactor containment vessel shown in FIG. 7 that does not apply this embodiment. Also, because outside and inside portions reaching the base mat 9 of the cylindrical wall 16 of the primary reactor containment vessel 6 and the pressure suppression pool floor 13 are formed of the steel plate reinforced concretes 10, it becomes possible to use steel plate reinforced concretes 10 at both side portions of the cylindrical wall 16, and due to the elimination of form panel and reinforcement construction, it is no longer necessary to use the conventional sequence of form panel construction→reinforcement construction→concrete placement→form panel removal. Thus construction speed of the reactor containment vessel in this embodiment is improved, and consequently, it becomes possible for the construction period to be shortened by more than three months.

Example 2

Figure 4A:
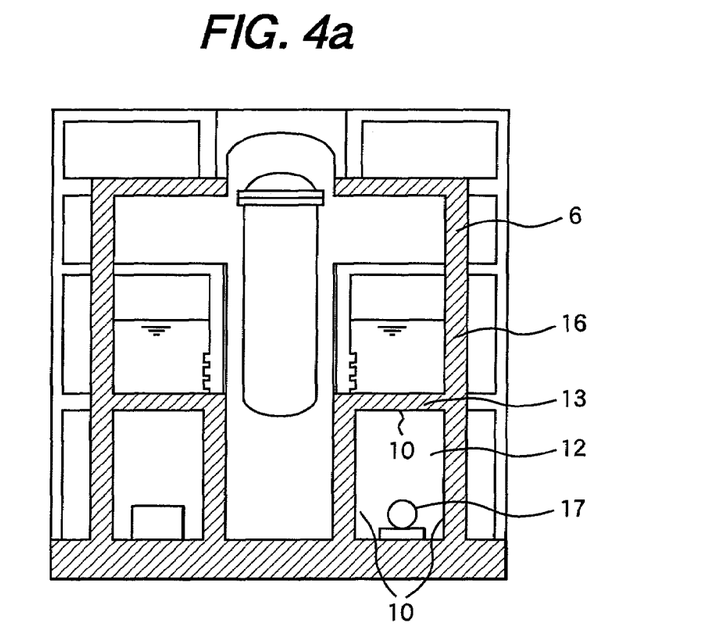
FIG. 4a is a longitudinal sectional view showing a reactor containment vessel according to another embodiment of the present invention.
Figure 4B:
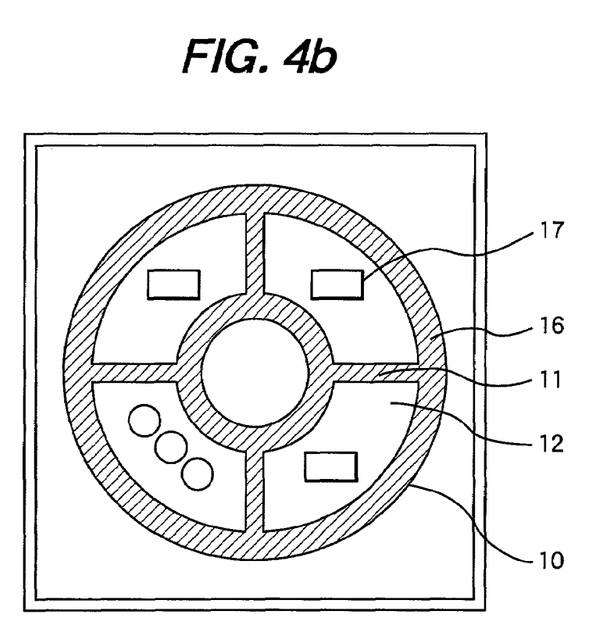
Figure 4C:
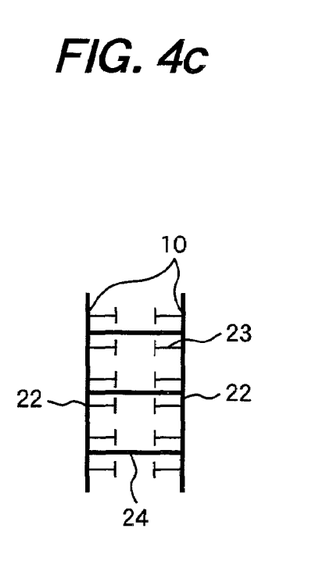

An example of the reactor containment vessel of another embodiment of the present invention is described using FIGS. 4a, 4b and 4c.

FIG. 4a shows a longitudinal section of the reactor containment vessel according to this embodiment. FIG. 4b shows a cross section of equipment rooms in the reactor containment vessel shown in FIG. 4a. FIG. 4c shows a longitudinal section of steel plate reinforced concretes being used the reactor containment vessel.

The equipment room is partitioned with partitions walls 11 installed on the base mat 9 so as to be radial from the inside cylindrical wall to the outside cylindrical wall being the cylindrical wall 16, in the circumferential direction. The safety-related equipment 17 is disposed in the partitioned equipment room.

The partition wall 11 is made of the steel plate reinforced concrete 10. The steel plates 22 locating on both side portions of the partition walls 11 are connected by the tie bars 24 respectively. The pressure suppression pool floor 13 is arranged over the equipment room 12 as shown in FIG. 4a.

At the time of construction, it is possible for each steel plate locating at the inside and outside portion of the outside cylindrical wall 16, both side portions of the partition walls 11 opposing each other and the inside portion of the inside cylindrical wall which form the equipment room to be integrally carried. For this reason, a new construction sequence for the installation of the partition wall 11 is not generated. Meanwhile, because the partition wall 11 can be used as wall for supporting the pressure suppression pool floor 13 from the lower side, it is possible to build the pressure suppression pool floor 13 without providing special temporary supporting structures for the large vertical direction load due to the concrete pouring when the pressure suppression pool floor 13 is being built. There is no need for a support column for supporting the pressure suppression pool floor 13 from beneath in the construction period in order to withstand this large vertical direction load in the period of pouring the concrete for the pressure suppression pool floor 13 using the partition walls 11. For this reason, construction of the pipes, cables and ventilation ducts for the safety-related equipment 17 installed in the equipment room can be done in parallel. Furthermore, because each surface of the inside, the outside and the ceiling of the equipment room 12 are formed of a strong steel plate with a thickness of 20 mm, the support for the pipes, cables and ventilation ducts can be directly connected by welding to the steel plates. By installing the equipment room in which the pipes, cables and ventilation ducts have already been installed, there is a great reduction in on-site construction inside the equipment room 12.

Plane dimensions in which the steel plates of the inside and outside portion the outside cylindrical wall 16, the steel plates of the partition wall 11 and the steel plate of the inside portion of the inside cylindrical wall forming the equipment room are integrally carried are determined by the capacity of a crane for installing these modules at the period of construction. Due to the arrangement of the safety-related equipment 17 and partition walls 11, a suitable proportion such that a weight of about 600 ton which is the average value for the suspension capability of the crane becomes possible. Because the steel plates of the inside and outside portion the outside cylindrical wall 16, the steel plates of the partition wall 11 and the steel plate of the inside portion of the inside cylindrical wall form a block having an enclosed space. After installation of the block, the pipe connection operation for the safety-related equipment 17 installed in the block can be performed under conditions separated from the surrounding environment and can be easily performed independent of the weather.

Example 3

An example of an embodiment of nuclear reactor building according to this invention will be described with reference to FIG. 5.

Figure 5:
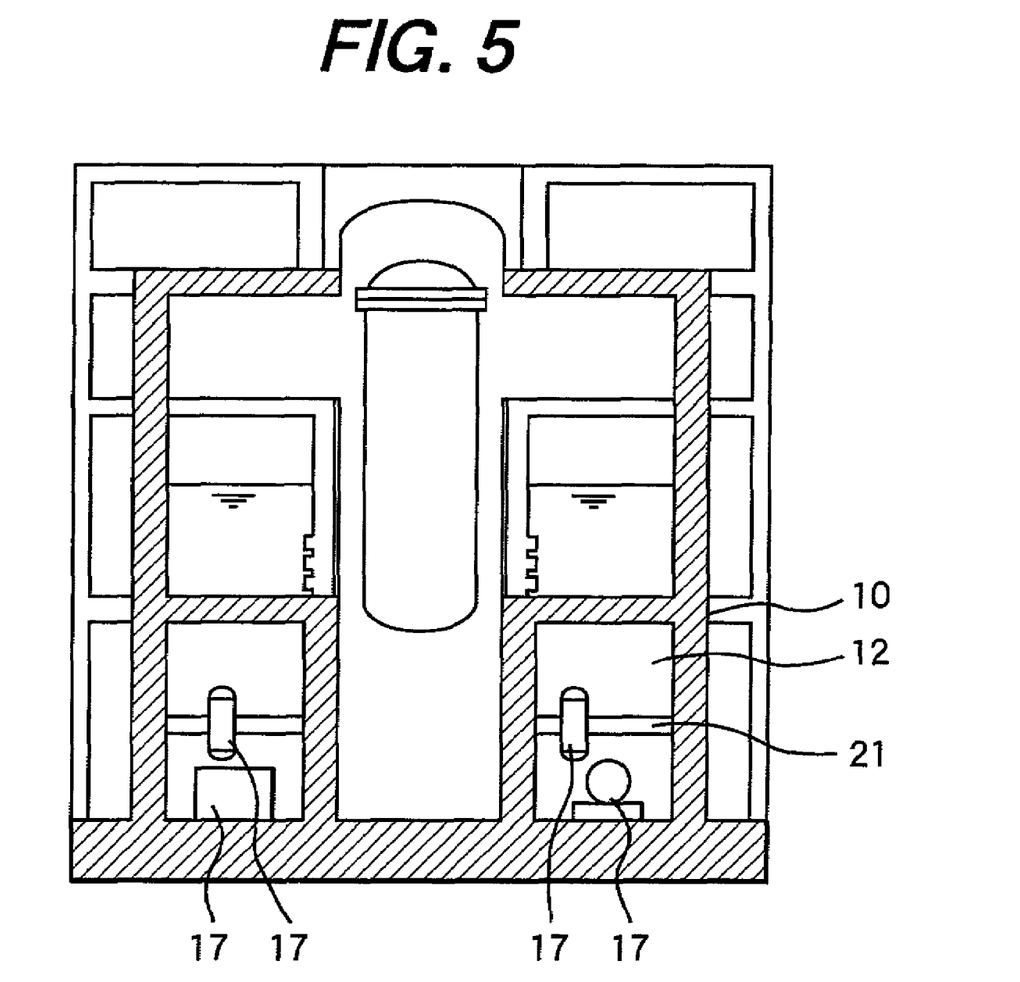
FIG. 5 is a longitudinal sectional view showing a reactor containment vessel according to another embodiment of the present invention.

FIG. 5 shows a longitudinal section of a reactor containment vessel according to another embodiment of the present invention. The reactor containment vessel of this embodiment has an equipment room 12 which is divided into a plurality of floors due to the system requirements of the safety-related equipment 17. The equipment room 12 shown in FIG. 5 is divided into two floors of an upper region and a lower region by the equipment room floor 21 provided with the inside cylindrical wall and the outside cylindrical wall. The equipment room floor 21 is formed of steel plate reinforced concrete 10.

Due to installment of the equipment room floor 21 installing the safety-related equipment 17, the related pipes, cables and the air heating and ventilation air conditioner ducts at the time of construction, the safety-related equipment 17, the pipes, cables, the air heating and ventilation air conditioner ducts and a block formed by each steel plate locating at the inside and outside portion of the outside cylindrical wall 16, both side portions of the partition walls 11 opposing each other and the inside portion of the inside cylindrical wall which form the equipment room can be constructed as an integral module. By the construction using the module, it can be expected that construction efficiency will be further improved. The equipment room floor 21 functions as a reinforce structure for preventing horizontal direction bending of the block and the reactor system device 17. Thus, it contributes to the reduction in the mass of the temporary reinforce structure comprising the H steel due to integrate the safety-related equipment 17 and the block.

What is claimed is:

1. A reactor containment vessel comprising:
    a primary reactor containment vessel including a dry well which stores a reactor pressure vessel, a wet well which stores a pressure suppression pool, and a vent pipe connecting said dry well and said pressure suppression pool;
    a secondary reactor containment vessel which surrounds said primary reactor containment vessel;
    an equipment room disposed in said primary reactor containment vessel at a position below said pressure suppression pool; and
    a base mat which supports both of said primary reactor containment vessel and said secondary reactor containment vessel;
    wherein said primary reactor containment vessel has a ceiling which includes concrete, an outer cylindrical wall which includes concrete and which extends to said base mat from said ceiling of said primary reactor containment vessel and which faces said dry well, said pressure suppression pool and said equipment room, respectively, an inner cylindrical wall which includes concrete and which faces said pressure suppression pool and said equipment room, respectively, and a pressure suppression pool floor which includes concrete and which partitions said pressure suppression pool and said equipment room; and
    wherein an outside portion of said outer cylindrical wall, an inside portion of said outer cylindrical wall which faces said equipment room, an inside portion of said inner cylindrical wall which faces said equipment room, an outside portion of said ceiling, and a lower portion of said pressure suppression pool floor which faces said equipment room are formed of a steel plate reinforced concrete including a steel plate and a connect member fixing said steel plate to said concrete, respectively; and
    wherein an inner side surface portion of said outer cylindrical wall which faces said dry well and said wet well is formed of said concrete without said steel plate which forms a part of said steel plate reinforced concrete at said outer side surface portion thereof.

2. The reactor containment vessel according to claim 1, wherein said equipment room is partitioned by a plurality of partition walls formed from said steel plate reinforced concrete.

3. The reactor containment vessel according to claim 1, wherein said equipment room is partitioned in height direction by a floor formed from said steel plate reinforced concrete disposed between said pressure suppression pool floor and said base mat.

4. The reactor containment vessel according to claim 2, wherein said equipment room is partitioned in height direction by a floor formed from said steel plate reinforced concrete disposed between said pressure suppression pool floor and said base mat.

5. The reactor containment vessel according to claim 1, wherein said steel plate is disposed on at least one of an outer surface and an inner surface of said outer cylindrical wall, an outer surface of said ceiling, an inner surface of said inner cylindrical wall and a lower surface of said pressure suppression pool floor.

6. The reactor containment vessel according to claim 1, wherein said inner side surface portion of said outer cylindrical wall without said steel plate is an entire inner side surface portion of said outer cylindrical wall which faces said dry well and said wet well.

7. The reactor containment vessel according to claim 6, wherein said entire inner side surface portion of said outer cylindrical wall which faces said dry well and said wet well and is formed of said concrete without said steel plate and without said connect member which fixes said steel plate to said concrete at said outer side surface of said outer cylindrical wall.

8. The reactor containment vessel according to claim 6, wherein said steel plate forming part of said steel plate reinforced concrete is provide at an entire outer side surface of said outer cylindrical wall including an entire outer side surface portion of said outer cylindrical wall in which said inner side surface portion thereof faces said dry well and said wet well.

9. The reactor containment vessel according to claim 7, wherein said entire inner side surface portion of said outer cylindrical wall which faces said dry well and said wet well and which is formed of concrete without said steel plate at said entire inner side surface portion has a steel liner at said entire inner side surface portion.

10. The reactor containment vessel according to claim 9, wherein a thickness of said steel plate forming part of said steel plate reinforced concrete at least at said outer side surface portion of said outer cylindrical wall is thicker than a thickness of said steel plate liner at least at said entire inner side surface portion of said outer cylindrical wall which faces said dry well and said wet well.

11. The reactor containment vessel according to claim 10, wherein said thickness of said steel plate forming part of said steel plate reinforced concrete is about 20 mm and the thickness of said steel plate liner is about 6.4 mm.

* * * * *